No. 809,757. PATENTED JAN. 9, 1906.
S. H. STEELE.
PLOW.
APPLICATION FILED JAN. 18, 1904.
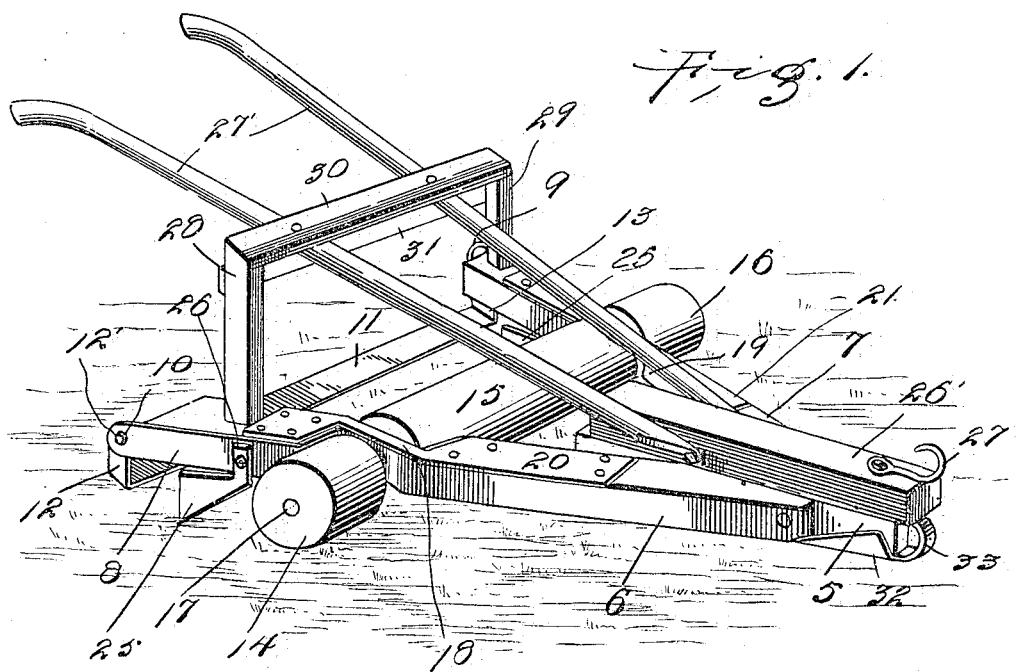
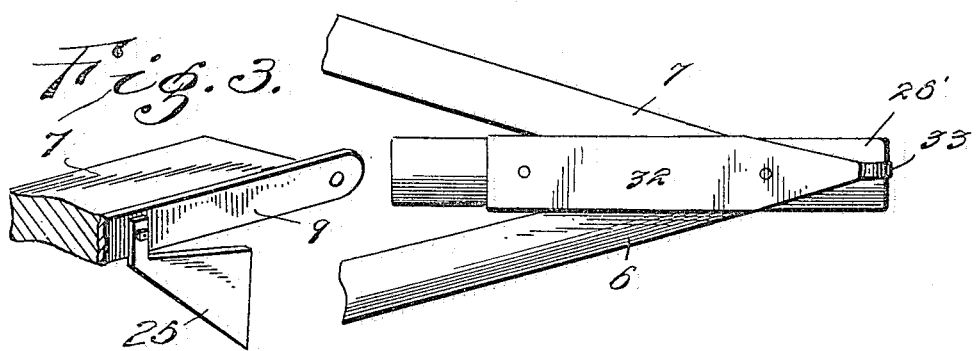
Witnesses
Inventor
Samuel H. Steele
By Chandlee & Chandlee
Attorneys

UNITED STATES PATENT OFFICE.

SAMUEL H. STEELE, OF CANAAN, INDIANA.

PLOW.

No. 809,757.      Specification of Letters Patent.      Patented Jan. 9, 1906.

Application filed January 18, 1904. Serial No. 189,552.

*To all whom it may concern:*

Be it known that I, SAMUEL H. STEELE, a citizen of the United States, residing at Canaan, in the county of Jefferson, State of Indiana, have invented certain new and useful Improvements in Plows; and I do hereby declare the following to be a full, clear, and exact description of the invention, such as will enable others skilled in the art to which it appertains to make and use the same.

This invention relates to farm implements; and it has for its object to provide an implement which will act to break the hard crust of the earth such as forms after a heavy rain, which will serve to uproot weeds and other objectionable growths, and which will also act to cultivate the soil.

Other objects and advantages of the invention will be understood from the following description.

In the drawings forming a portion of this specification, and in which like numerals of reference indicate similar parts in the several views, Figure 1 is a perspective view showing an implement embodying the present invention. Fig. 2 is a bottom plan view of a portion of the implement. Fig. 3 is a detail view of a portion of one of the sills with its cultivator-shovel.

Referring now to the drawings, there is shown an implement comprising a base-frame, including a central beam 5, at the sides of which are connected the sills 6 and 7, which diverge rearwardly and extend beyond the rear end of the central beam. Against the outer faces of the sills 6 and 7 are secured pairs of plates 8 and 9, respectively, which project beyond the rear ends of the sills, these projecting portions lying in spaced relation and the plates of each pair having transverse alining perforations 10.

A blade 11 is provided, having its end portions 12 and 13 bent upwardly on lines that converge forwardly of the blade, so that these upturned portions lie in convergent planes, so that they may be engaged in the interspaces between the corresponding pairs of plates 8 and 9, in which positions they are held by transverse bolts 12'. The blade is thus held at an acute angle to the ground, so that as the implement is drawn forwardly the blade will enter the ground and the dislodged earth will pass upwardly and be discharged over the rear edge of the blade.

The base-frame is supported upon the ground by means of a series of rollers 14, 15, and 16, which are mounted upon a shaft 17, passed transversely through the sills 6 and 7 in advance of the cutter-blade. At those portions of the sills through which the shaft passes said sills are reduced in lateral thickness, as shown at 18 and 19, to form the parallel portions illustrated, and these portions of the sills are reinforced by plates 20 and 21, which are correspondingly shaped and are secured upon the upper faces of the sills. The roller 15 is fitted between the portions 18 and 19, while the rollers 14 and 16 are at the outer sides thereof. The rollers are of the same diameter, which is such that they project slightly below the base-frame and support the latter at a slight elevation above the ground.

Cultivator-shovels are employed and consist each of a plate 25, having a stem 26 projecting at right angles thereto, and the stems of the shovels are bolted against the plates 9 at the outer faces of the sills, with the blade proper extending rearwardly from the stem and the lower edge thereof extending downwardly, so that the lower rear corner enters the earth.

Upon the beam 5 is bolted a supplemental beam 26', having at its forward end a hook 27 for connection of draft appliances and having bolted against the side faces of its rear end portion the handles 27', which diverge upwardly and rearwardly therefrom and extend beyond the cutter-blade. Upon the rear end portions of the sills are posts 28 and 29, to which are secured vertically-spaced transverse braces 30 and 31, between which are passed the handles of the implement and to which said handles are secured.

Against the under face of the beam 5 is secured a metallic shoe 32, which covers the lines of connection or the joints between said beam and the sills, so as to prevent dirt being forced into said joints, the forward end portion of the shoe being bent at its sides upwardly against the forward end portion of the beam 5, which said forward end portion is tapered at its sides. From the forward end of the shoe there is an integral extension 33, which extends upwardly of the front edge of the beam 5 and is engaged at its upper end in the forward end portion of the supplemental beam, which projects slightly beyond the beam 5. This integral extension serves as a means of attachment of draft appliances and also protects the front edge of the beam 5.

In practice modifications of the specific construction shown may be made, and any suitable materials and proportions may be used for the various parts without departing from the spirit of the invention.

What is claimed is—

An improvement of the character described comprising a frame, including a beam, sills secured against the side faces of the beam and diverging rearwardly beyond the rear end of the beam, said sills being reduced intermediate their ends in lateral thickness to form parallel portions, a shaft passing through the reduced portions of the sills, rollers mounted upon said shaft, one of the rollers being disposed between said sills and one roller adjacent the outer face of each sill, the intermediate roller being of greater length than the end rollers, a blade bridging the rear ends of the aforesaid sills, cultivator-shovels secured to the sills between the blade and the aforesaid rollers, a supplemental beam secured upon and projecting slightly forwardly of the first-named beam and having means for attachment of draft appliances, posts upon the rear end portions of the sills, vertically-spaced braces secured transversely of the posts at the upper end of the latter, handles secured to the supplemental beam and passed rearwardly and upwardly between and attached to the side braces, and a shoe secured against the under side of the first-named beam and the adjacent portions of the sills, said shoe having an integral forward extension extending upwardly at its front edge and secured to the supplemental beam.

In testimony whereof I affix my signature in presence of two witnesses.

SAMUEL H. STEELE.

Witnesses:
 ELIJAH MATHEWS,
 JOHN H. NILES.